United States Patent [19]

Tanino

[11] 4,450,898
[45] May 29, 1984

[54] AIR CONDITIONER FOR AUTOMOTIVE VEHICLE

[75] Inventor: Mikio Tanino, Yokohama, Japan

[73] Assignee: Nissan Motor Company, Limited, Yokohama, Japan

[21] Appl. No.: 268,065

[22] Filed: May 28, 1981

[30] Foreign Application Priority Data

Jun. 2, 1980 [JP] Japan ................................ 55-72824

[51] Int. Cl.³ ............................................. F25B 29/00
[52] U.S. Cl. ...................................... 165/25; 62/239; 62/164; 165/17; 165/43
[58] Field of Search ............... 62/239, 164; 98/2.08; 74/55, 57; 165/14, 65, 103, 42, 43, 23, 24, 25, 17

[56] References Cited

U.S. PATENT DOCUMENTS 3,263,739  8/1966  Gaskill et al. ................ 165/25
4,337,818  6/1982  Franz ........................... 165/43
4,354,547  10/1982 Sugiura ......................... 165/25

FOREIGN PATENT DOCUMENTS 53-18142  2/1978  Japan ........................... 98/209
2068593   8/1981  United Kingdom ........... 165/42

Primary Examiner—Albert W. Davis, Jr.
Attorney, Agent, or Firm—Lane, Aitken & Kananen

[57] ABSTRACT

An air conditioner for an automotive vehicle having an air conditioner compressor driven with a crankpulley of an internal combustion engine, with an electromagnetic clutch energized, and linked with an evaporator for cooling and dehumidifying the intake air and an air mixing door located upstream of a heater core for heating the intake air. In such a conventional air conditioner there is provided, in addition to a manipulating lever located on a control panel and first switch indicated by A/C switch for actuating the clutch of the air conditioner compressor, a first engagement mechanism linked with said manipulating lever and engaged with a lever attached to the air mixing door for adjusting the degree of opening of the air mixing door so as to determine the quantity of air passing through the heater core according to the position to which the manipulating lever is moved in the heating direction with the first switch turned off, a second switch connected in parallel with the first switch which turns on in response to a temperature signal from a temperature sensing means adjacently located downstream from the evaporator, and a second engagement mechanism linked with the manipulating lever and with the second switch for adjusting the on-and-off time period of the second switch according to a position to which the manipulating lever is moved in the cooling position, with the first switch turned on, whereby the air conditioner compressor is actuated efficiently so that an engine fuel can be saved remarkably.

19 Claims, 9 Drawing Figures

FIG.4
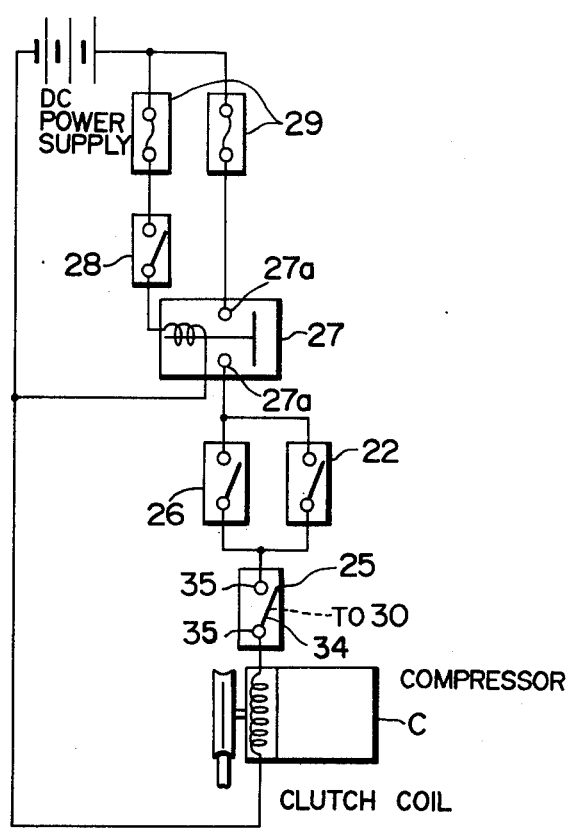
FIG.5
(a) 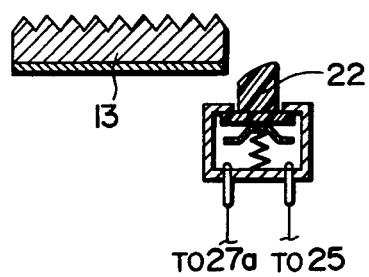
(b) 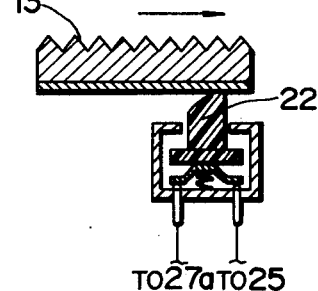

FIG. 7
(a)
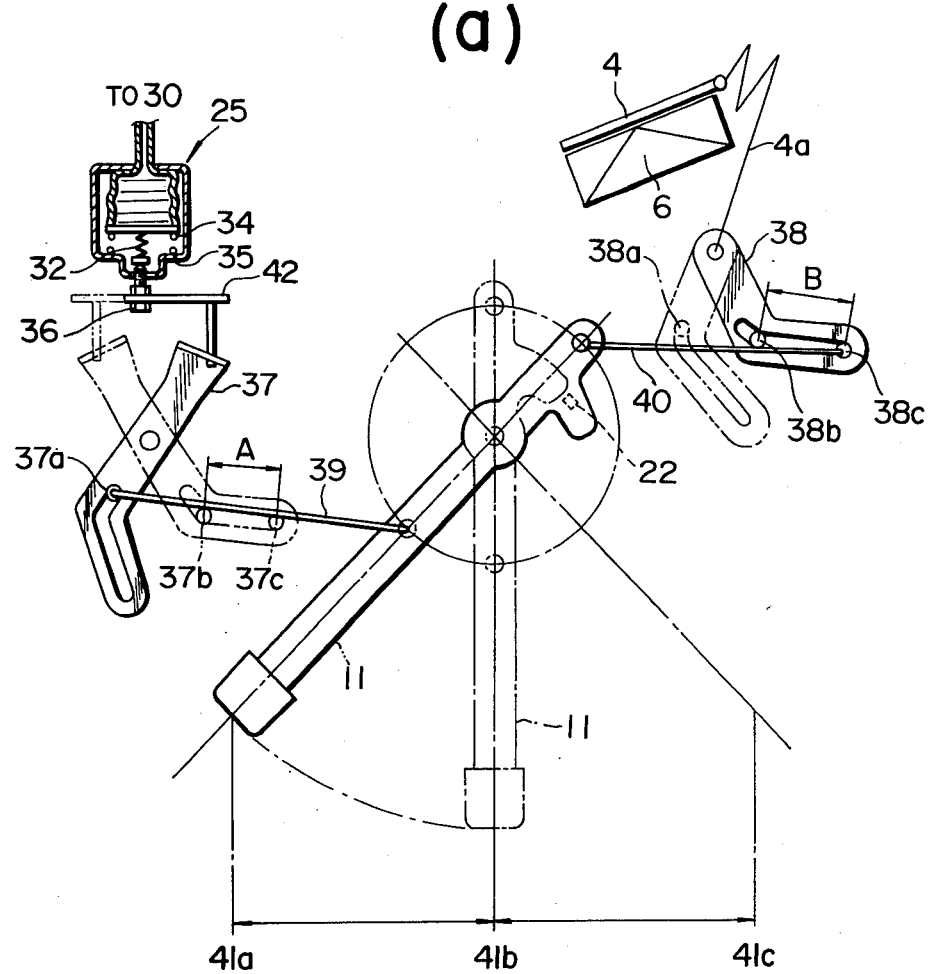
(b)
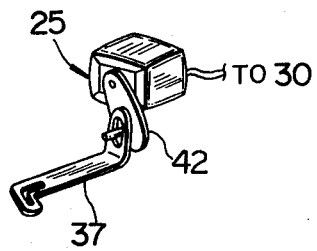

AIR CONDITIONER FOR AUTOMOTIVE VEHICLE

BACKGROUND OF THE INVENTION (1) Field of the Invention

The present invention relates to an improvement of an air conditioner mounted in an automotive vehicle, and more specifically relates to an air conditioner for an automotive vehicle having an air conditioner compressor, linked with an evaporator located within an air conditioner duct actuated by an internal combustion engine with its electromagnetic clutch energized by a DC power supply, that can work efficiently depending on the cooling, heating and dehumidification modes.

(2) Statement of the Prior Art

An air conditioner is a combined unit of an evaporator, heater, and blowing fan and provides heating and cooling functions. In addition, it has bi-level and ventilation functions, enabling comfortable air conditioning in all seasons. Controls for all functions described above are housed in a front seat instrument panel, thereby assuring driving comfort. The component units of the air conditioner are installed in the engine or the passenger compartment; the compressor and condenser in the former and the unit comprising the evaporator, heater, and blowing fan described above and its control in the latter.

In a conventional air conditioner for an automotive vehicle, when a temperature adjusting lever on a control panel of the air conditioner is positioned in a cooling range with an air conditioning switch indicated by A/C (hereinafter simply referred to as A/C switch) located on the control panel beside the temperature adjusting lever turned off, an air-mixing door positioned upstream of an heater core swings to close the passage to the heater core so that a small amount of intake air inspired by the blowing fan passes through the heater core. Consequently, the air is distributed into the passenger compartment at a relatively low temperature. On the other hand, when the temperature adjusting lever is positioned in a hot range opposite to the cooling range, the air-mixing door swings to close the air bypass so that a large amount of intake air inspired by the blowing fan is forced to flow through the heater core through which hot water from the engine cooling system is circulated. Consequently, the air is distributed into the passenger compartment at a relatively high temperature.

With the A/C switch turned on, the intake air inspired by the blowing fan is cooled and dehumidified by means of the evaporator linked with the air compressor, the air temperature adjusted in the same process as described above.

It will be seen that a functional control lever usually located on the control panel below the temperature adjusting lever determines the air flowing through the heater core or its bypass further to pass through a ventilator, defroster or floor.

However, in such a conventional air conditioner of this type, the temperature adjusting lever is set at an appropriate position with the A/C switch turned on to condition the air within the passenger compartment, whereby the angular opening position of the air mixing door is changed and correspondingly the air heated by the heater core is mixed with the cooled air which has bypassed the heater core. Even when the temperature outside the automotive vehicle is not too high, however, the air conditioner compressor always operates and thereby wastefully consumes fuel during operation, since the compressor pulley is actuated by a belt which links with the engine crankshaft pulley. Another pulley called an armature is attached to the compressor shaft. When the A/C switch is turned on with the engine running, an armature coil is energized to turn the compressor shaft with the rotating pulley. If the humidity within the passenger compartment is high during the heating, part of the windshield becomes fogged. It is therefore necessary to dehumidify the passenger compartment by turning on the A/C switch to energize the armature coil of the compressor to operate with the engine. However, also in this case the continuous operation of the compressor causes wasteful consumption of fuel supplied to the engine.

SUMMARY OF THE INVENTION

With the above-described problem in mind, it is an object of the present invention to provide an improved air conditioner of the construction wherein in the heating mode intake air inspired by the blowing fan is partly or wholly passed through the heater core, with the air conditioner compressor not actuated, to warm the air according to the degree of opening of the air-mixing door determined by the displacement of the manipulating lever from the central position toward a position in the heating range, in the cooling mode the intake air passed through the evaporator is sent into a passenger compartment via a bypass of the heater core with the air-mixing door blocking the air flow through the heater core and the air conditioner compressor is actuated intermittently by means of an on/off period variable switch connected to a DC power supply which turns on and off so as to actuate or interrupt the air conditioner compressor according to a temperature-indicative signal which is outputted from a temperature sensing bulb located downstream of the evaporator when the air passed through the evaporator exceeds a predetermined reference temperature, the predetermined reference temperature being varied according to an angular displacement of the manipulating lever from the central position toward a position for cooling the intake air, and in the dehumidification mode, e.g., for defogging the windshield the intake air is wholly or partly passed through the heater core with another switch located on the control panel which actuates the air conditioner in the hot-dehumidification mode turned on and with the air conditioner compressor actuated intermittently according to the on/off variable switch which turns on and off so as to actuate or interrupt the air conditioner compressor intermittently with a period between turning on the on/off period variable switch and turning the switch off being set shorter than in the cooling mode so as to minimize the rate of operation of the air conditioner compressor since the predetermined reference temperature of the temperature sensing means is held at maximum, the angular displacement of the manipulating lever being in the heating range in response to the temperature-indicative signal of the temperature sensing means, so that the air conditioner can be operated appropriately according to the operation modes and the compressor can be actuated efficiently without wasteful consumption of the DC power and engine fuel.

BRIEF DESCRIPTION OF THE DRAWINGS

The features and advantages of an air conditioner for an automotive vehicle according to the present invention will be better appreciated from the following description taken in conjunction with the accompaying drawings in which like reference numerals designate corresponding elements, and in which:

FIG. 4 shows an electrical circuit diagram of an air conditioner for an automotive vehicle according to the present invention;

FIGS. 5(a) and 5(b) show detailed relation between a second rack gear for a cooler and air conditioning (A/C) switch to explain how the rack gear engages with the A/C switch;

FIGS. 7(a) and 7(b) shows a schematic drawing of an air conditioner for an automotive vehicle of a second preferred embodiment according to the present invention.

DESCRIPTION OF THE PREFERRED EMBODIMENTS

Figure 1:
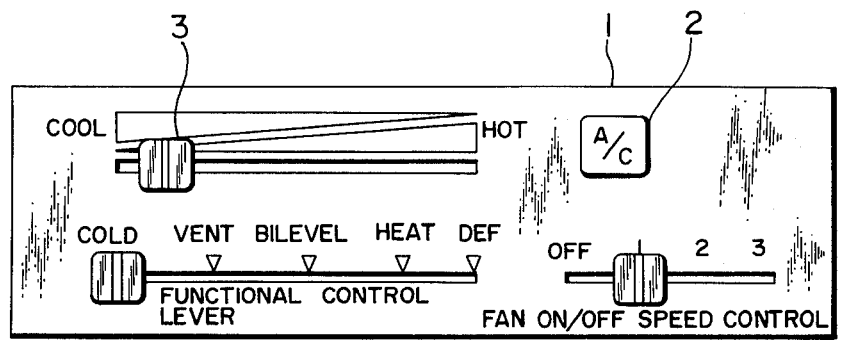
FIG. 1 shows a front view of an instrument control panel arrangement in a conventional air conditioner.
Figure 2:
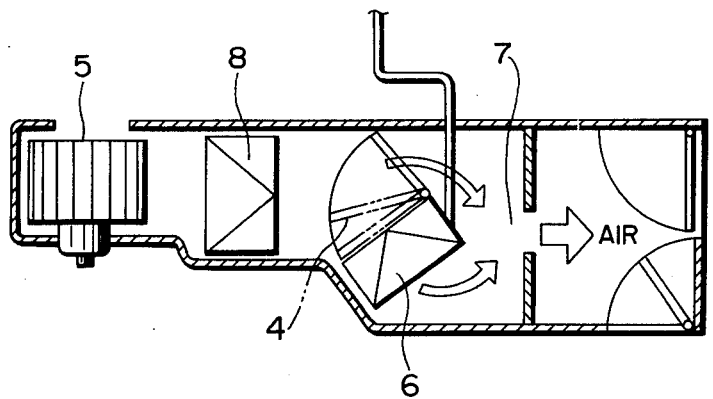
FIG. 2 shows a cross-sectional view of the construction of the conventional air conditioner.

Reference will be made to the drawings from FIG. 1 to FIG. 7. In FIG. 1 and FIG. 2 which show an control panel and partial construction of a conventional air conditioner for an automotive vehicle, when a temperature-adjusting lever 3 (hereinafter referred to as TEMP lever) is placed in the COOL position with an air conditioning switch 2 (hereinafter abbreviated as A/C switch) turned off and preferably a functional control lever (hereinafter referred to as FUNCTION lever) located below the TEMP lever 3 set in the COLD or VENT, BI-LEVEL positions, an air mixing door 4 is moved to close the passage to a heater core 6 through which hot water from the engine cooling system is circulated so that a small amount of the intake air inspired by a blowing fan 5 is passed through the heater core 6 and sent out to the passenger compartment at a relatively low temperature. It will be seen that the functional control lever determines the air flow passed through the heater core 6 or its bypass to further pass through a ventilator, floor and/or defroster. On the other hand, when the TEMP lever 3 is placed in the HOT position with the A/C switch remaining on and preferably the FUNCTION lever set in the HEAT or DEF positions, the air mixing door 4 is moved to open the passage to the heater core 6 and thus to close the bypass of the heater core 6 so that a large amount of the intake air inspired by the blowing fan 5 is passed through the heater core 6 and sent out to the passenger compartment through the floor or defroster door at a relatively high temperature.

In such situations, when the A/C switch 2 is turned on, the intake air inspired by the blowing fan 5 is passed through an evaporator 8 now in operation where the intake air is cooled and dehumidified to adjust the temperature and then sent out to the passenger compartment in the same process as described above.

In a reheat type air conditioner, the air conditioner operates continuously in the A/C mode. If this cools the air too much, some of the intake air is diverted through the heater core 6 so that it is reheated. This reheated air then merges with the cooled air to provide the proper temperature of air as required by the TEMP lever 3 setting. However, in such a conventional "reheat" type air conditioner, the air conditioner compressor, not shown in FIGS. 1 and 2, is operated without interruption even if the outside air temperature is not much higher than the inside air temperature. Consequently, a wasteful amount of fuel is consumed by the air conditioner compressor. In addition, when the humidity within the passenger compartment is so high that windshields become fogged, it is necessary to dehumidify the passenger compartment by means of the air conditioner compressor with the A/C switch 2 turned on and preferably the FUNCTION lever set to the DEF position so that the air passed through the heater core 6 is further passed through the defroster door not shown in detail in FIG. 2. This situation indicates wasteful fuel consumption since the air compressor continues in operation.

Figure 3:
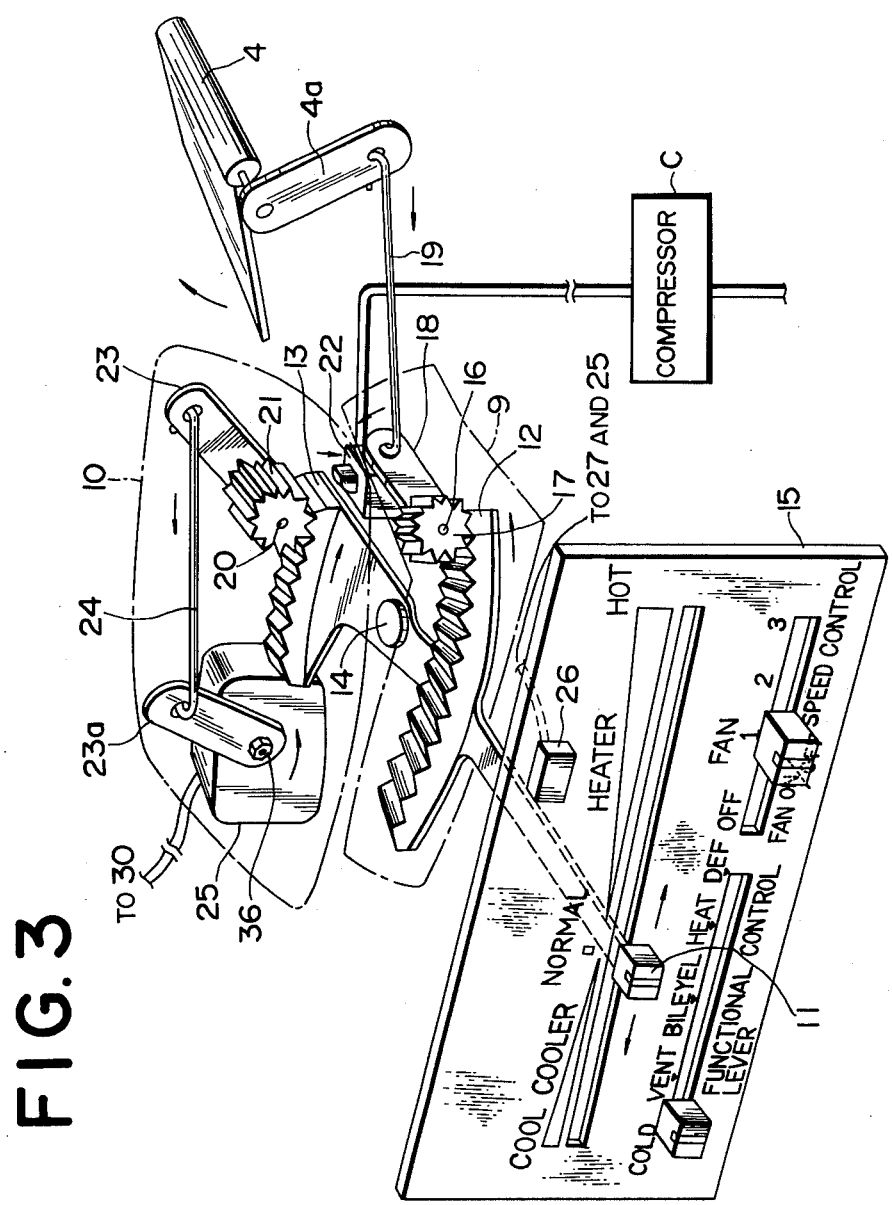
FIG. 3 shows a perspective view of an air conditioner within the control panel of the first preferred embodiment according to the present invention.

With reference to FIGS. 3 and 4, an air conditioner of a first preferred embodiment according to the present invention will be described hereinafter.

As shown in FIG. 3, the air conditioner within a control panel 15 includes a heat engagement mechanism 9 and a cooling engagement mechanism 10. The heat engagement mechanism 9 comprises a first rack gear 12 integrally formed with a manipulating lever 11 at an intermediate position between an axle 14 and a control panel 15 and which turns in the same direction with the axle as a center as the manipulating lever 11 is moved toward the HOT position, while the cooling engagement mechanism 10 comprises a second rack gear integrally formed with the manipulating lever 11 at its end opposite the axle 14 faced against the first rack gear 12 and which turns in the opposite direction with the axle 14 as a center as the manipulating lever 11 is moved toward the COOL position.

In more detail, in addition to the first rack gear 12, the heat engagement mechanism 9 comprises a first pinion gear 17 rotatably supported by an axle 16 so as to engage with the first rack gear 12 when the manipulating lever 11 is moved from a NORMAL position to a HEATER range (right direction as viewed from the drawing), a first pinion gear lever 18 rotatably supported together with the axle 16 of the first pinion gear 17, and a first rod 19 linked with the first pinion gear lever 18. In accordance with the movement of the first rod 19 which moves with the manipulating lever 11 setting, the air-mixing door 4 is swung at a required angle through an actuating lever 4a attached to the air mixing door 4.

On the other hand, in addition to a second rack gear 13, the cooling engagement mechanism 10 comprises a second pinion gear 21 supported by an axle 20 which engages with the second rack gear 13, an air conditioning pushbutton type switch 22 which turns on when the second rack gear 13 is moved toward the left direction as viewed from FIG. 3, a second pinion gear lever 23, fixed to the axle 20 of the second pinion gear 21, which rotates as the second pinion gear 21 rolls on the second rack gear 13 a second rod 24, one end thereof linked with one end of the second pinion gear lever 23 the other end of the second pinion gear lever 23, and an on/off time period variable switch adjusting lever 23a one end thereof linked with an on/off time period variable swich 25 and the other end thereof linked with the second pinion gear lever 23 via the second rod 24 (the on/off time period switch 25 has a construction wherein the time period from its turning on time to subsequent turning-on time can be adjusted according to the angular displacement of the on/off time period variable switch adjusting lever 23a in response to the rotation of the second pinion gear 21 when the cooling system including evaporator is operated). The detailed operation and construction of the on/off time period variable switch 25 will be described later with chief reference to FIG. 6.

It will be seen that the control panel 15 is provided with a push-button locking-type dehumidifying switch 26 for electrically actuating the air conditioner compressor.

In FIG. 4, which shows an electric circuit diagram of the air conditioner according to the present invention, an electromagnetic clutch of an air conditioner compressor C is connected in series with the on/off time period variable switch 25. The air conditioning (A/C) switch 22 and dehumidifying switch 26 are intervened between a fixed contact 27a of a relay 27 and the on/off time period variable switch 25. Numeral 29 denotes a fuse and numeral 28 denotes a switch provided in an accessory circuit of an ignition system of the engine.

FIGS. 5(a) and 5(b) show partial views of the second rack pinion 13 of the heat engagement mechanism 10 and air conditioning (A/C) switch 22. The operation of the second rack pinion 13 and air conditioning (A/C) switch 22 will be described hereinafter.

Figure 6:
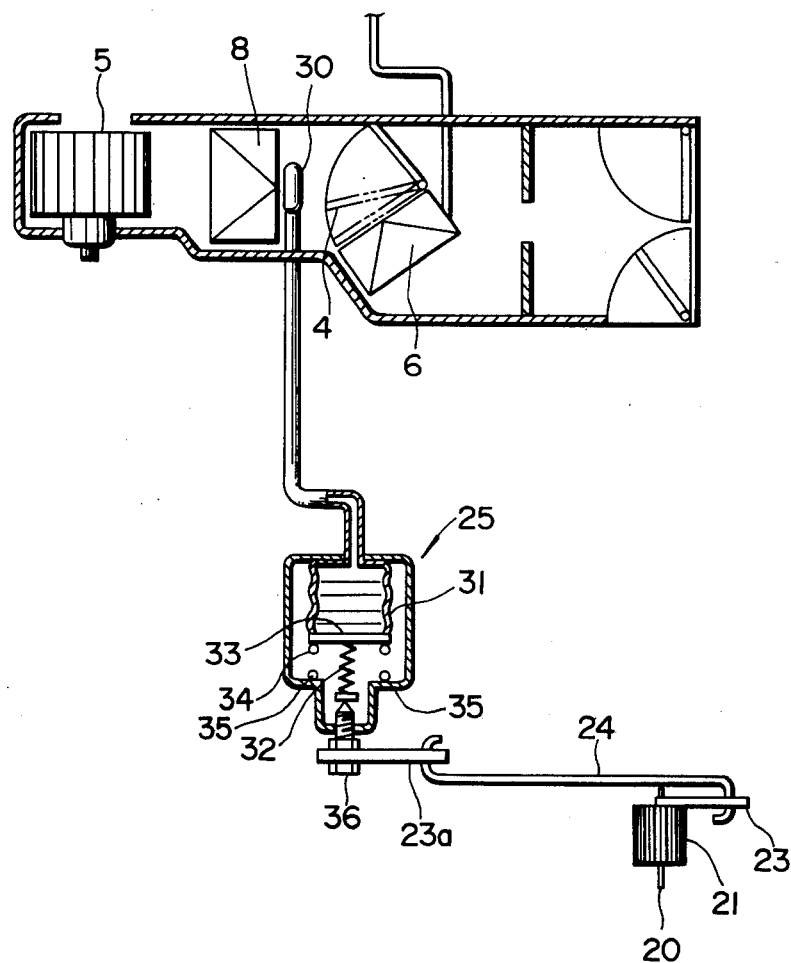
FIG. 6 shows a longitudinally cross-section view of part of the construction of the air conditioning unit according to the present invention.

As shown in FIG. 6, which shows the internal construction of an air conditioning unit of the air conditioner according to the present invention, a temperature sensing bulb 30 is positioned downstream (at the rear as viewed from the drawing) of the evaporator 8 and a bellows 31 within the on/off time period variable switch 25 is linked with the temperature sensing bulb 30, a metal piece 33 being attached to the lower end of the bellows 31. The on/off time period variable switch 25 of a box shape contains a pair of stationary contacts 35 at a position of an inside wall facing a pair of movable contacts 34 attached to the metal piece 33. As is appreciated from FIG. 6, the metal piece 33 is attached to the lower end of the bellows 31 supported by means of a spring 32. At the lower end of the spring 32, a screw 36 is provided on the on/off time period variable switch 25 for adjusting the spring pressure. On the other hand, at the top of the adjusting screw 36 the free end of the spring 32 is positioned so that the movable piece 33 is pushed upward. One end of the second pinion lever 23 is supported at the axle 20 of the second rack pinion 21 and the other end of the second pinion lever 23 is linked with one end of the second rod 24. The other end of the second rod 24 is linked with one end of the on/off time period variable switch adjusting lever 23a. It will be seen that the other end of the on/off time period variable switch adjusting lever 23a is fixed by means of the screw 36.

The operation of the first preferred embodiment is described particularly at first in the case of the cooling mode. As shown from FIG. 3 to FIG. 6, when the manipulating lever 11 is moved from the NORMAL position to the left cooling portion of the temperature-adjustment range as shown in FIG. 3, the second rack gear 13 is moved as shown by an arrow in FIG. 5(b) so that the air conditioning (A/C) switch 22 is turned on and then the air conditioner compressor is connected to the DC power supply via the on/off time period variable switch 25. As appreciated from FIG. 3, at this time the first pinion gear 17 is already disengaged with the first rack gear 12.

Furthermore, at this time the second rack gear 13 is moved right and correspondingly the second pinion gear 21 in engagement with the second rack gear 13 rotates counterclockwise as viewed from the control panel 15 and the second pinion gear lever 23 whose one end is supported at an axle 20 of the second pinion gear 21 rotates counterclockwise. Consequently, the rod 24 linked with the second pinion gear lever 23 is moved toward a leftmost direction. A lever 23a, whose one end is attached to the side of the on/off time period switch 25, rotates counterclockwise and the adjusting screw 36 within the on/off time period switch 25 is released so that the spring pressure of the spring 32 becomes weaker. At this time, the distance between both electrical contacts of the on/off time period variable switch 25 becomes shorter since the inherent pressing force of the bellows 31 presses against the spring 32 and the spring 32 accordingly presses against the adjusting screw 36 whose threaded portion is projected from the on/off time period variable switch 24. Consequently, when the temperature of air at the rear of the evaporator 8 is raised slightly higher than the reference temperature determined by the temperature sensing bulb 30, both contacts 34 and 35 come immediately into contact with each other because of the short distance between both contacts 34 and 35 depending on the increase in a gas pressure from the temperature sensing bulb 30 applied to the bellows 31, the bellows 31 bringing the attached movable contacts 33 in an immediate contact with the stationary contacts 35, so that the number of times the on/off time period switch 25 turns on depending on the temperature fluctuations of air inspired into the duct to be passed through the evaporator becomes increased.

With reference to FIGS. 3 and 4, the operation of the air conditioner according to the present invention is described below in the heating mode.

When the manipulating lever 11 is moved into the right heating portion of the temperature-adjustment range from the NORMAL position and the FUNCTION lever located below the manipulating lever 11 on the control panel which selects the outlets of the air-conditioned air in the conventional manner is preferably set in the HEAT position, the second rack gear 13 is disengaged with the second pinion gear 21 since the second pinion gear 21 moves left with the axle 14 as a center as viewed from FIG. 3, the air conditioning switch 22 being disengaged from the second pinion gear 21 and turned off thus the air conditioner compressor C thereby being deengerized and the evaporator 8 stopping its cooling function as appreciated from FIG. 4. In addition, since the second rack gear 13 moves left and the second pinion gear 21 rotates clockwise until the second rack gear 13 is disengaged from the second pinion gear 21, the second pinion gear lever 23 also rotates clockwise. Consequently, the adjusting screw 36 is turned accordingly clockwise and intrudes into the on/off time period variable switch 25 as appreciated from FIG. 6 so as to strengthen the spring pressure. At this time, the spring 32 lifts the bellows 31 in response to the pressing force from the adjusting screw 36. The distance between both contacts 34 and 35 of the on/off time period switch 25 becomes, therefore, longer than in the case of the cooling mode so as to preset the minimum length of compressor operation time. In this heating mode, the air conditioner compressor C is forcedly not actuated even if the on/off time period variable switch 25 is turned on unless the modulation switch 26 located on the control panel 15 is turned on by an operator, as is appreciated from FIG. 4.

On the other hand, the first pinion gear 17 is engaged with the first rack gear 12 at this time so that the first pinion gear 17 rotates counterclockwise with the manipulating lever 11, the air mixing door 4 swinging to a proper angle via the first pinion gear lever 18 and first rod 19.

When the windshield becomes dim and requires dehumidification in the heating mode, the dehumidification switch 26 is turned on and the FUNCTION lever 1 is preferably set to DEF, per prior art, so that the air conditioner compressor C is made ready to be actuated as will be appreciated from FIG. 4. The operating condition of the air conditioner compressor C is that the distance between contacts 34 and 35 of the on/off time period switch 25 is maximized and the air conditioner compressor C is actuated only when the temperature difference from the reference temperature is large since the on/off time period switch 25 is set in the maximum on/off time period by the cooling engagement mechanism 10. The period of the air conditioner compressor C in operation is shortest and most favorable from the standpoint of fuel efficiency.

FIG. 7 shows a second preferred embodiment according to the present invention.

In FIG. 7, when the manipulating lever 11 is positioned at a maximum cooling position 41a as indicated by a solid line, a heater rod 40 enters a first inaction zone B provided in a heater control link 38 so that the air mixing door 4 linked with the heater control link 38 still closes fully the intake air passage to the heater core 6. At this time, a cooler rod 39 pushes against a cooler control link 37 at the leftmost position so that the adjusting screw 36 rotates counterclockwise and simultaneously the pressure of the spring 32 becomes weakest and the distance between both contacts of the on/off time period variable switch 25 becomes shortest. Consequently, the on-time of the on/off time period variable switch 25 is set at longest. When the manipulating lever 11 is moved from the maximum cooling position 41a to the NORMAL position 41b, the air conditioning switch (A/C) switch 22 turns off to interrupt the current from the DC power supply to the air conditioner compressor C, so that the intake air inspired by the blowing fan 5 is sent through the bypass into the passenger compartment. At this time, the heater rod 40 moves from one end position 38c to the other end position 38b in the first inaction zone B of the heater control link 38. Consequently, the heater control link 38 does not move. The air-mixing door 4, in this state, remains in the maximum cooling position (i.e., the air-mixing door 4 closes fully the air passage through the heater core 6). In addition, since the cooler control link 37 is moved from the maximum cooling position 37a to the minimum heating position 37b, the on/off time period adjusting lever 42 rotates clockwise so that the adjusting screw 36 rotates clockwise accordingly. Consequently, the distance between both contacts 34 and 35 becomes longer.

When the manipulating lever 11 is moved from the NORMAL position 41b to a maximum heating position 41c, the cooler rod 39 is positioned at a rightmost position 37c in a second inaction zone A of the cooler control link 37. Consequently, the cooler control link 37 does not move and the air conditioner compressor C remains off since the A/C switch 22 does not touch with the manipulating lever 11. The heater control link 38 rotates as the heater rod 40 shifts from the leftmost position 38b of the first inaction zone B to the maximum heating position 38a. Consequently, the air mixing door 4 opens so as to allow the entire intake air to pass through the heater core 6.

As an electrical alternative to the on/off time period variable switch 25 and temperature sensing bulb 30, an on/off time period variable thermostat connected to a thermistor as the temperature sensing means may be used. In this case, the on/off time-period variable thermostat comprises an electromagnetic relay whose contacts are connected between the air conditioner compressor C and A/C switch 22, a thermostat control amplifier connected to the electromagnetic relay, a variable resistor, whose resistance value can be varied according to the movement of the cooling engagement mechanism 10 in the first preferred embodiment or the cooler control link 37 in the second preferred embodiment, connected to the thermostat control amplifier in series with the thermistor located downstream of the evaporator 8.

In this construction, the on/off time period of the thermostat electromagnetic relay can be varied with the variable resistor so that as the resistance value of the variable resistor is increased, i.e., the manipulating lever 11 is moved to the heating range from the cooling range, the on/off time period becomes maximized in the same way as described in the first and second preferred embodiments.

According to the present invention, there is provided an air conditioner of the construction described hereinbefore whereby temperature adjustments for heating and cooling can be made independently of each other and the compressor is actuated intermittently during the cooling operation, while actuated in the heating mode by turning on the dehumidification switch if dehumidification is required in the heating mode with the maximum period of operation.

Therefore, efficient cooling is possible and fuel can also be saved remarkably in the case of dehumidification during heating.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. An air conditioner for an automotive vehicle's compartment having an air conditioner compressor actuated by means of an internal combustion engine of the vehicle with an electromagnetic clutch provided therein energized and linked with an evaporator, located downstream of an air blower for inspiring an intake air, which constitutes an air cooling system with the air conditioner compressor and an air-mixing door located adjacent to and upstream of a heater core through which hot water from the engine cooling system is circulated for heating the air passing therethrough and located downstream of the evaporator for adjusting the amount of air flowing through the heater core, said air conditioner comprising:

(a) a pivotable manipulating lever (11), one end thereof being projected from a control panel so as to pivot along the control panel between two extremes;

(b) a first switch (22) provided electrically between a DC power supply of the automotive vehicle and the electromagnetic clutch of the air conditioner compressor located at a position below said manipulating lever such that said manipulating lever turns said first switch on while said manipulating lever is pivoted along the control panel toward a position for cooling the intake air inspired by the air blower for connecting the DC power supply to the clutch of the air conditioner compressor to actuate the air compressor when said switch is turned on;

(c) a first engagement mechanism (9, 38, and 40) linked with said manipulating lever and engaged with an air-mixing door actuating lever fixed to the air-mixing door for cooperatively adjusting the degree of opening of the air mixing door so as to determine the quantity of intake air passing through the heating core according to an angular displacement of said manipulative lever toward a position for heating the intake air inspired by the air blower, with said first switch turned off so as to interrupt the air conditioner compressor;

(d) a second switch (25), connected electrically in series with said first switch for operatively actuating the clutch of the air conditioner compressor with said first switch turned on, which turns on so as to actuate the clutch of the air conditioner compressor when pressure of gas within a temperature sensing bulb located downstream of the evaporator for detecting the temperature of the intake air passed through the evaporator is increased according to the increase in the intake air temperature passed through the evaporator above a predetermined reference temperature value; and (e) a second engagement mechanism (10, 37 and 39), linked with said manipulating lever and engaged with said second switch, which controls an interval of time between turning on and subsequent turning off of said second switch which corresponds to changing of the predetermined reference temperature value so as to adjust the rate of operation of the air conditioner compressor according to a displacement of said manipulating lever toward the position for cooling the intake air inspired by the air blower and holds said interval time therebetween at maximum which corresponds to holding the predetermined reference temperature value of the temperature sensing bulb at its maximum value when said manipulating lever is angularly displaced toward the position for heating the intake air inspired by the air blower.

2. An air conditioner for an automotive vehicle as set forth in claim 1, which further comprises:

(f) a third switch (26) connected electrically in parallel with said first switch for actuating the clutch of the air compressor when turned on so as to dehumidify the inside air of the automotive vehicle when said manipulating is positioned in the heating range.

3. An air conditioner for an automotive vehicle as set forth in claim 2, wherein said second switch is set to turn on in the maximum on-and-off time period.

4. The air conditioner as set forth in claim 1, wherein said first engagement mechanism maintains the air-mixing door actuating lever at a fixed position so as to close the air-mixing door to block the air flow cooled by the evaporator through the heater core while said manipulating lever is angularly displaced in the position for cooling the intake air inspired by the air blower, whereby the intake air cooled by the evaporator does not pass through the heater core but passes wholly through a bypass thereof.

5. The air conditioner as set forth in claim 1, wherein said first switch is located below said manipulating lever and includes a projecting member having a movable contact fixed thereto and a pair of stationary contacts, one of the stationary contacts being connected to a DC voltage supply and the other stationary contact being connected to the clutch of the air conditioner compressor via said second switch, said projecting member being located in the course of movement of said manipulating lever toward the position for cooling the intake air inspired by the air blower so that said movable contact is brought in contact with said stationary contacts to turn on said first manipulating lever.

6. An air conditioner for an automotive vehicle as set forth in claim 5, wherein said first switch is a selfreturning push-button switch.

7. The air conditioner as set forth in claim 1, wherein said second switch comprises:

(a) a casing having a pair of stationary contacts fixed thereto, one of said stationary contacts being connected to said first switch and the other being connected to the clutch of the air conditioner compressor;

(b) a bellows mounted within said casing, one end thereof linked with the temperature sensing means and the other end thereof provided with a metal piece serving as a movable contact, which moves toward said pair of stationary contacts so that said metal piece is brought in contact with said pair of stationary contacts according to the temperature-indicative signal sent from the temperature sensing means;

(c) a spring, one end thereof connected to the other end of said bellows; and (d) a screw engaged with the other end of said spring and having a threaded portion rotatably inserted through said casing which supports said spring so as to adjust a distance between said metal piece attached to said bellows and said pair of stationary contacts in response to a displacement of said second engagement mechanism when said manipulating lever is displaced toward the position for cooling the intake air inspired by the air blower.

8. An air conditioner as set forth in claim 1, wherein said first engagement mechanism comprises:

(a) a first rack gear (12) provided on one side of said manipulating lever with its axle as a center;

(b) a first pinion gear (17) engaged with and turned by said first rack gear when said manipulating lever is moved into the heating range of the temperature-adjustment range so as to open or close the air-mixing door;

(c) a first linkage member (18 and 19) connected between an axle of said first pinion gear and air-mixing door actuating lever for transmitting the rotational movement of said first pinion gear with respect to said first rack gear to the air mixing door actuating lever so as to adjust the degree of opening of the air mixing door according to the position at which said manipulating lever is moved.

9. An air conditioner for an automotive vehicle as set forth in claim 8, wherein said first linkage member comprises a first pinion gear lever (18), attached to an axle of said first pinion gear, which rotates with the rotational movement of said first pinion gear and a first rod (19) connected between said first pinion gear lever and air mixing door actuating lever for changing the rotational movement of said first pinion gear lever to a reciprocal movement to rotate the air mixing door actuating lever.

10. An air conditioner for an automotive vehicle as set forth in claim 8, wherein said first pinion gear disengages with said first rack gear, closing the air mixing door fully so as not to pass the intake air through the heater core, when said manipulating lever is moved into the cooling range of the temperature-adjustment range.

11. An air conditioner for an automotive vehicle as set forth in claim 1 or 8, wherein said second engagement mechanism comprises:
   (a) a second rack gear (13) provided on the side opposite of said manipulating lever with its axle as a center;
   (b) a second pinion gear (21) engaged with and turned by said second rack gear when said manipulating lever is moved so as to adjust the on-and-off time period of said second switch;
   (c) a second linkage member (23, 23a and 24) connected between an axle of said second pinion gear and said second switch for transmitting the rotational movement of said second pinion gear with respect to said second rack gear to said second switch.

12. An air conditioner as set forth in claim 11, wherein said second linkage member comprises a second pinion gear lever (23), attached to the axle of said second pinion gear, which rotates with said second pinion gear, a second switch adjusting lever (23a) connected to said second switch, and a second rod (24) connected between said second pinion gear lever and said second switch adjusting lever for changing the rotational movement of said second pinion gear lever to a reciprocal movement to rotate said second switch adjusting lever so as to adjust the on-and-off time period.

13. An air conditioner for an automotive vehicle as set forth in claim 11, wherein said second pinion gear disengages with said second rack gear, said second pinion setting said second switch in the maximum on-and-off time period, when said manipulating lever is moved into the heating portion of the temperature-adjustment range.

14. The air conditioner as set forth in claim 7 or 12, wherein said second switch adjusting lever is fixed to said screw of said second switch.

15. The air conditioner as set forth in claim 1, wherein said first engagement mechanism comprises:
   (a) a first elongated rod (40), one end thereof pivotally fixed to the other end of said manipulating lever; and
   (b) a heating control link (38), having an elongated hole with which the other end of said first elongated rod is engaged, which pivots in response to the angular displacement of said manipuating lever for transmitting the displacement of said manipulating lever to the air-mixing door actuating lever so as to adjust the opening angle of the air-mixing door in proportion to the angular displacement of said manipulating lever toward the position for heating the intake air inspired by the air blower and locking the transmission thereof to the air-mixing door actuating lever with the air-mixing door in the position to block the air flow through the heater core when said manipulating lever is moved into the position of the cooling range of the temperature-adjustment range.

16. The air conditioner as set forth in claim 15, wherein the elongated hole of said heating control link has a first inaction zone in which said heating control link does not pivot so as to actuate said air-mixing door actuating lever, regardless of the movement of said first elongated rod, during the displacement of said manipulating lever in the cooling position of the temperature-adjustment range.

17. The air conditioner as set forth in claim 7, wherein said second engagement mechanism comprises:
   (a) a second elongated rod (39), one end thereof pivotally fixed to the other end of said manipulating lever;
   (b) a cooling control link (37), having an elongated hole with which the other end of said second elongated rod is engaged which pivots in response to the displacement of said manipulating lever for transmitting the displacement of said manipulating lever to said second switch so as to control said interval of time of said second switch in proportion to the displacement of said manipulating lever toward the position for heating the intake air inspired by the air blower and locking the transmission thereof to said second switch, with said interval of time set at the maximum when said manipulating lever is displaced into the position of the heating range of the temperature-adjustment range; and
   (c) a third linkage member (42) adaptively fitted to said cooling control link and to said screw of said second switch for converting the pivotal displacement of said cooling control link to a corresponding rotational movement so as to turn said screw to move toward said bellows via said spring of said second switch.

18. The air conditioner as set forth in claim 17, wherein the elongated hole of said cooling control link has a second inaction zone in which said cooling control link does not pivot so as to actuate said third linkage member, regardless of the movement of said second elongated rod, when said manipulating lever is moved into position of the heating range of the temperature-adjustment range.

19. An air conditioner for an automotive vehicle's compartment which comprises: (a) an air conditioner compressor and an air conditioner compressor driving circuit for driving said compressor; (b) an evaporator operatively connected to said compressor for cooling an intake air inspired by an air blower; (c) a heater core arranged at a location downstream of said evaporator; (d) a passage bypassing said heater core; (e) a pivotable air-mixing door disposed to guide an air flow from said evaporator, respectively, through only said bypass passage at a first angular position, through only said heater core at a second angular position, and through said bypass passage and through the heater core between the first and second angular positions; (f) a lever which is pivoted between a first angular range and a second angular range with a fulcrum thereto as a center; (g) a first linkage member connected between said lever and air-mixing door which controls the angular position of said air-mixing door continuously between the first and second angular positions when said lever is angularly displaced within the first angular range and holds the angular position of said air-mixing door at the first angular position when said lever is angularly displaced within the second angular range; (h) a temperature sensor located downstream of said evaporator for detecting the temperature of the intake air passed through said evaporator; (i) a first switch member included in said compressor driving circuit operable to close said compressor driving circuit so as to actuate said compressor when said lever is angularly displaced within the second angular range; (j) a second switch member, included in said compressor driving circuit in series with said first switch member and linked with said temperature sensor, which is operable to close said compressor driving circuit so as to actuate said compressor with said first switching member when said temperature sensor produces an output signal indicating that the temperature of intake air passed through said evaporator exceeds a predetermined temperature value and to open said compressor driving circuit to render said compressor inoperative when said temperature sensor produces no output signal to indicate that the temperature of the intake air passed through said evaporator is below the predetermined temperature value; (k) a second linkage member connected between said lever and second switch member which controls an interval of time between the closures of said second switch member so as to adjust the range of operation of said compressor continuously when said lever is angularly displaced within the second angular range and holds the interval of time at maximum when said lever is angularly displaced within the first angular range; and (l) a third switching member, included in said compressor driving circuit in parallel with said first switch member, operable to close said compressor driving circuit so as to actuate said compressor when said lever is angularly displaced within said first and second angular ranges regardless of the open and closure of said first switch member.

* * * * *